Dec. 12, 1933.     W. M. SNYDER     1,939,147
CHUCK
Filed June 18, 1930
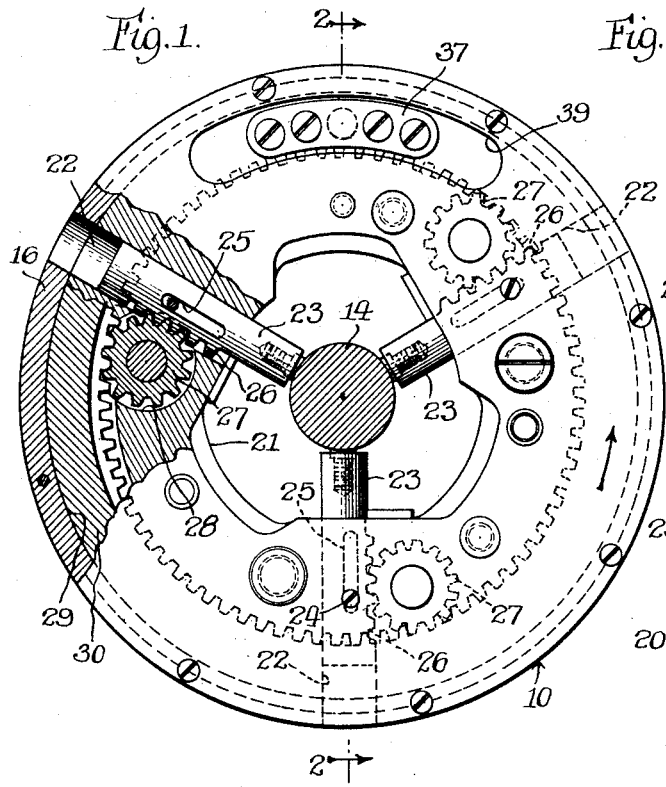
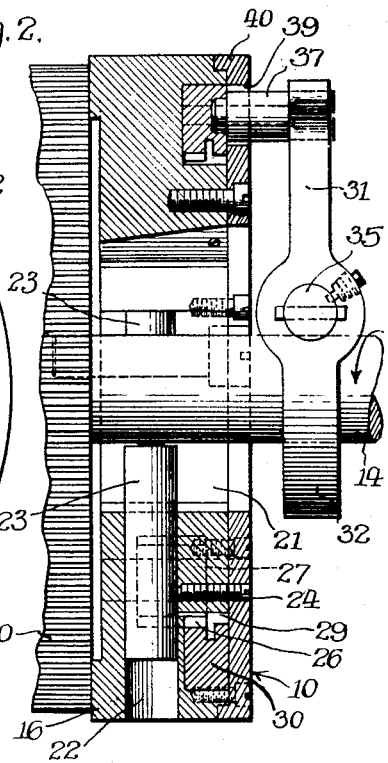
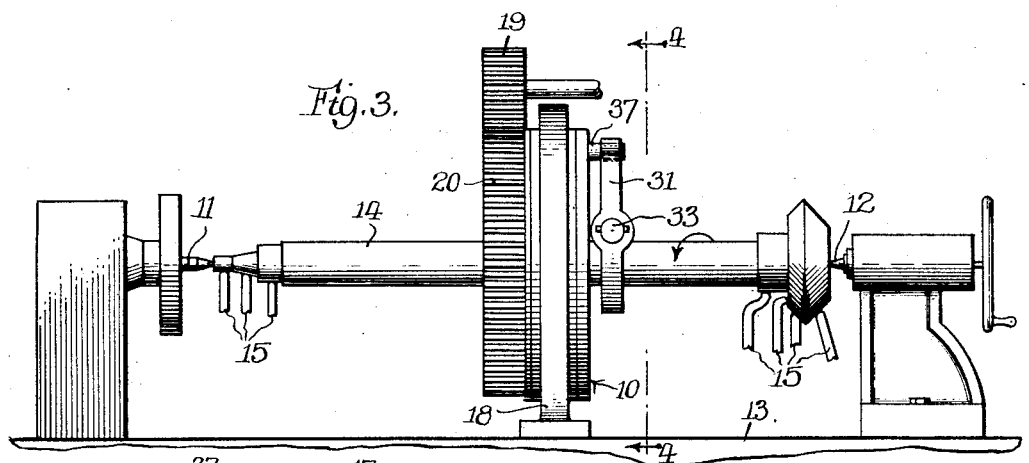
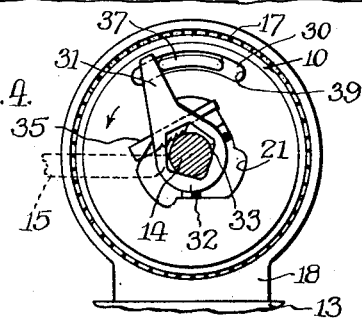
Inventor:
Walter M. Snyder,
By Chindell Parker Carlson
Attys.

Patented Dec. 12, 1933

1,939,147

UNITED STATES PATENT OFFICE 1,939,147

CHUCK

Walter M. Snyder, Detroit, Mich., assignor to Sundstrand Machine Tool Co., Rockford, Ill., a corporation of Illinois Application June 18, 1930. Serial No. 461,913

15 Claims. (Cl. 82—40)

The invention relates generally to chucks adapted for use in machine tools such as lathes and it relates more particularly to chucks wherein the retarding action of the tools on the work is utilized to clamp the chuck jaws firmly onto the work piece.

Chucks of this character heretofore have employed a plurality of toothed eccentrics pivotally mounted in circumferentially spaced relation about the chuck axis and arranged to engage the work with increasing force as the rotation of the work by the chuck is resisted by the tools. Such chucks are objectionable since the action of each jaw is independent of the other jaws with the result that the work may be shifted transversely in the chuck after the cutting operation has started.

The primary object of the present invention is to provide a new and improved chuck of this character having jaws movable toward and away from the work by a common operating means arranged to cause simultaneous movement of all of the jaws, together with means having a single non-rotative connection with the work and acting on the operating means to cause simultaneous clamping of the jaws when rotative movement of the work by the chuck is retarded, as for instance, by application of the tools to the work.

Another object is to provide such a chuck wherein the jaws are simultaneously actuated by means adapted to be operated by an abutment or dog on the work whereby to cause the work to be clamped with a force proportional to the resistance impressed upon the work by the tools.

When a chuck is used for driving the work at or near the center in a double end lathe the jaws must be retracted for a considerable distance in order to facilitate the endwise insertion of the work pieces through the opening in the chuck, and another object of the invention is to provide an automatically operable chuck having jaws which may be readily and quickly retracted to provide a large opening through the chuck.

When the jaws of a chuck are retracted for a considerable distance as in a center drive chuck, the manual performance of the jaw retracting movement requires considerable time, and another object of the invention is to provide a chuck for such lathes wherein the jaw operating means comprises reversible gearing capable of being moved by force applied to either end of the gearing so that the weight of the work in the chuck jaws will cause the jaws to move to their open position when the jaw closing force is released and the weight of the work is released from the centers.

The above and other objects are obtained in the preferred embodiment of the invention illustrated herein through the provision of a chuck having a plurality of radially movable jaws each having a rack thereon engaged by pinions mounted on the chuck body, and a ring gear engaging all of the pinions and having a lug projecting longitudinally from the chuck body whereby the ring gear may be moved by a dog secured on a work piece and arranged to engage the lug when the rotation of the work piece is retarded so as to clamp the jaws simultaneously upon the work piece.

Other objects and advantages will become apparent from the following detailed description taken in connection with the accompanying drawing, in which Fig. 1 is an end elevational view of a chuck embodying the invention in its preferred form, certain of the parts being broken away to show the enclosed jaw-operating mechanism.

Fig. 2 is a sectional view of the chuck taken along the line 2—2 of Fig. 1.

Fig. 3 shows diagrammatically the manner of mounting such a chuck in a double end lathe.

Fig. 4 is a somewhat diagrammatic end elevational view of the chuck taken from the line 4—4 of Fig. 3 showing a work piece in operative relation to the chuck.

For purposes of disclosure the preferred form of the invention is illustrated in the drawing and will hereinafter be described in detail as a center drive chuck for a double end lathe, but it is to be understood that this disclosure is not intended as a limitation of the invention to the particular form shown, it being contemplated that various changes might be made by those skilled in the art without departing from the spirit and scope of the invention as defined by the appended claims.

In the preferred form herein illustrated the invention is embodied in a chuck 10 adapted for use as a center drive chuck in a double end lathe having a head-stock center 11 and a longitudinally adjustable tailstock center 12 both mounted on a bed 13 and adapted to rotatably support an elongated work piece 14 for a performance of a plurality of turning and facing operations by means of a plurality of tools 15 shown diagrammatically in Figs. 3 and 4.

As shown in Figs. 1 and 2, the chuck comprises a main body 16 rotatably mounted on the bed 13 coaxially with the centers 11 and 12 by means of a ball bearing 17 carried on a frame 18 fixed on the bed. In the present case the chuck is driven from a suitable power source through a pinion 19 which engages a gear 20 fixed on one side of the body 16.

When the chuck is intended for use on a double end lathe, as in the present case, the body 16 has a central aperture 21 formed therein through which the elongated work piece 14 may be passed for the purpose of supporting it between the two centers 11 and 12. Opening into the aperture 21 are a plurality of radial bores 22, formed in the body 16 and disposed in circumferentially spaced relation about the rotative axis of the chuck to provide slideways for a plurality of work engaging jaws 23, one of which is mounted in each of the bores 22. Each of the jaws 23 is preferably held against rotation and its longitudinal movement limited by a screw 24 (Figs. 1 and 2) extending into the chuck body and engaging a longitudinal slot 25 formed in one side of the jaw 23.

In accordance with the present invention the jaws 23 are moved in unison toward and away from the rotative axis of the chuck whereby to clamp the work, and the means for accomplishing this result is preferably of such a character that movement may be transmitted with equal facility from the operating means to the jaws and vice versa, since by providing such a reversible power transmitting connection the unclamping of the work may be greatly facilitated.

To this end a rack 26 is formed on each of the jaws 23 within the chuck body 16 and a plurality of pinions 27 are rotatably mounted on the body, one adjacent to each of the jaws and in engagement with the racks 26. The pinions 27 are rotatable about axes parallel to the chuck axis and are mounted in cylindrical chambers 28 formed in the chuck body. The chambers 28 each open into an annular recess 29 formed in the body, in which recess a ring gear 30 is mounted for rotative movement relative to the chuck body, and each of the pinions 27 extends axially of the chuck past the sides of the jaws and into engagement with the teeth of the ring gear 30. Thus, the jaws 23 may be moved in unison toward and away from a work piece by relative rotative movement of the ring gear 30 and the chuck body.

In the performance of a turning or facing operation upon the work piece 14, illustrated in Fig. 3, the chuck 10 is rotated in the direction indicated by the arrows in the drawing, and the jaw-operating means is arranged to move the jaws 23 toward clamping position when the ring gear 30 is moved relative to the chuck body in the opposite direction, that is, clockwise as shown in Figs. 1 and 4. Such relative movement of the ring gear and the chuck body may be obtained by retarding the movement of the ring gear 30 while the chuck is rotated in a counter-clockwise direction (Figs. 1 and 4), and such retardation of the ring gear 30 is preferably obtained by the action of the cutting tools 15 on the work and is transmitted through the work to the ring gear.

When the work 14 does not have a peripheral abutment of any kind, as in the present case, the retarding action of the tools may be transmitted to the jaw operating means by means detachably secured to each piece of work. This means is preferably in the form of a dog 31 embodying means for effecting a quickly detachable connection with the work. For the purpose of attaching the dog 31 to the work, the dog has an enlarged end 32 having an angular aperture 33 through which the work 14 may extend. A locking pin 35 may be provided for securing the dog 31 to the work.

In its operative position on a piece of work, the dog 31 extends radially from the work to engage an abutment in the form of a lug 37 provided on the ring gear 30. The lug 37 projects longitudinally of the chuck through an arcuate slot 39 formed in a closure plate 40 which is secured to the surface of the chuck in closing relation to the annular recess 29.

When the chuck 10 is rotated and the tools are brought into engagement with the work to effect a cutting operation, the dog 31 on the work will be engaged by the lug 37 and will cause relative movement of the ring gear 30 and the chuck body to clamp the work in the chuck. The clamping force thus exerted upon the work will at all times be directly proportional to the force being exerted on the work by the tools.

When, upon the completion of the cutting operation the tools 15 are withdrawn and the rotation of the chuck is stopped, the chuck clamping force is automatically removed without additional effort upon the part of the operator. Subsequent retraction of the tail stock center 12 causes the weight of the finished work piece to be dropped upon the jaw or jaws 23 which happen to be below the work piece and due to the reversible power transmitting character of the jaw operating means, the weight of the work will cause all of the jaws to be moved to their open or retracted positions.

The work piece 14 may then be withdrawn and another work piece easily inserted due to the large opening between the jaws which may be provided, as a practical matter, by reason of the automatic opening and closing of the jaws. In practice a plurality of dogs 31 are provided which may be secured to a number of different work pieces and hence a new piece of work may be inserted into the machine as soon as the finished work piece has been removed.

From the foregoing it will be apparent that the invention provides an improved chuck operable invariably to clamp the work with a force proportional to the resistance applied to the work by the cutting tool. By reason of the fact that the dog on the work has a direct rather than a wedging abutment with the jaw operating means, the jaw clamping force is released as soon as the tools are withdrawn, thereby enabling the operator to remove the work without the performance of an unclamping operation. The reversible gearing employed in the chuck contributes to this result and makes possible the provision of a chuck having a large opening so that the work may be inserted readily.

I claim as my invention:

1. A chuck comprising a body adapted to be rotated about a given axis, a plurality of jaws mounted on said body in circumferentially spaced relation about said axis for radial movement toward and from said axis, means operable to move said jaws including a member movable circumferentially about said axis, and means on said member adapted to be connected to a work piece to prevent relative rotation of the work and said means in one direction whereby to cause simultaneous clamping movement of all of said jaws when rotation of the work is retarded.

2. In a device of the class described, a chuck body adapted to be rotated about a given axis, means for rotating said body, a plurality of circumferentially spaced jaws mounted on said body for radial movement with respect to said axis, means for actuating said jaws in unison including a member movable circumferentially about said axis, and a dog adapted to be mounted on a work piece to engage said member and clamp the jaws by rotation of the work piece relatively to the chuck.

3. The combination of a chuck having a body adapted for rotation about a given axis, a plurality of clamping jaws mounted on said body and movable toward and away from a work piece positioned for rotation about said axis, means mounted on said body for moving said jaws including a part movable on said body, and a dog adapted to be fixed on a work piece in position to engage and move said part on said chuck during relative rotation of the work and said chuck in one direction to clamp said jaws on the work.

4. In a device of the character described the combination of a rotatable chuck body, a plurality of jaws mounted on said body for movement toward and away from a work piece positioned for rotation about the rotative axis of the chuck body and arranged to engage and clamp a work piece at a plurality of circumferentially spaced points, means for moving said jaws including a part movable with respect to said chuck body and operatively connected to all of the jaws, and means adapted to be mounted on a work piece to engage and move said part relatively to the chuck body when rotation of the work by the chuck is retarded.

5. The combination of a chuck having a rotatable body, means for rotating said body, work centering and clamping members movable toward and away from a work piece, operating means for moving said members in unison to clamp a work piece in the chuck, said operating means including a part movable relatively to said body circumferentially of said axis, and means acting between the work piece and said part as an incident to the application of a cutting tool to the work during rotation of said chuck to move said part relatively to said body to clamp said members on the work.

6. A work driving chuck comprising, in combination, a chuck body rotatable with the work, circumferentially spaced work clamping and driving jaws carried on said body and movable toward and away from a work piece rotatable about the axis of said chuck body, a jaw operating member carried on said body and movable relatively thereto, and gearing between said member and all of said jaws arranged to transmit movement with equal facility from said member to the jaws or vice versa.

7. A chuck comprising a rotatable chuck body, a plurality of jaws mounted on said body in circumferentially spaced relation for sliding movement radially toward and away from the chuck axis, adapted to engage a work piece without wedging action, a member movably mounted on said body, and gearing between said member and all of said jaws arranged to transmit movement with equal facility from said member to said jaws or vice versa, said member projecting from the body so as to be engageable by a dog on the work when the chuck is rotated.

8. The combination of a rotatable chuck body rotatable with the work, work clamping and driving jaws mounted in circumferentially spaced relation on said body for movement toward and from a portion of a work piece positioned for rotation about the rotative axis of the body and arranged to engage a work piece without wedging action, a jaw actuating member mounted on said body for circumferential movement relatively thereto, gearing between said member and all of said jaws arranged to move said jaws and to transmit movement with equal facility from said member to the jaws or vice versa, means for driving said chuck body independent of said gearing, and means for retarding the movement of said jaw actuating member relatively to the chuck body during rotation of said chuck to clamp said jaws on a work piece, said means automatically becoming ineffective to clamp said jaws when the chuck is stopped.

9. A work driving chuck comprising, in combination, a rotatable body rotatable with the work, a plurality of work clamping and driving jaws mounted in circumferentially spaced relation on said body for movement toward and away from a work piece positioned for rotation about the rotative axis of the body, a plurality of pinions mounted in said body, one of said pinions being adjacent to each of said jaws, a rack on each of said jaws engaging the adjacent pinion, a ring gear mounted on said body for rotation about the chuck axis and operatively connected to said pinions to rotate the same in unison, and a lug on said ring gear projecting from said body for engagement by an actuating means.

10. A work driving chuck comprising, in combination, a rotatable chuck body rotatable with the work, a plurality of work clamping and driving jaws mounted on said body in circumferentially spaced relation for movement toward and away from a work piece, means operable to move said jaws in unison, said means including a part movable circumferentially of said body adapted to be engaged constantly during rotation of the chuck body to retard movement of said part and apply a clamping force to the jaws, and means mounted independently of the chuck arranged to engage said part to apply a clamping force to the jaws.

11. The combination of a rotatable chuck body, driving mechanism for rotating said body in one direction, a plurality of jaws mounted on said body for movement relatively thereto into clamping engagement with a work piece positioned along the rotative axis of said body, means mounted on said body operable to move said jaws in unison, said means including a part movable circumferentially of said body, an abutment on said part facing in an advancing direction with relation to the direction of rotation imparted to said body by said driving mechanism, said jaw operating means being operable to clamp the work during rotation of said chuck by a restraining force applied to the advancing face of said abutment, and a dog adapted to be clamped on a work piece to lie in the path of said abutment whereby said abutment rotates the work during the initial rotation of the chuck, said dog and said abutment cooperating, when the work is retarded by application of the tools thereto, to clamp said jaws upon the work in unison.

12. In a machine tool, the combination of a rotatable chuck body, a chuck jaw mounted on said body for movement toward and away from a portion of a work piece positioned for rotation about the rotative axis of the body, means for moving said jaw including a member mounted on said body and movable relatively to the body to move said jaw, and means arranged during rotation of the chuck to act between said member and a work piece in said chuck to transmit the retarding action of the tools from the work to said member to cause clamping movement of the jaw.

13. In a lathe having means for rotatably supporting a work piece, the combination of a driven chuck rotatable about the axis of said means, a plurality of jaws movably mounted in said chuck, a member movably mounted in said chuck for rotation relatively thereto about the rotative axis of the chuck, means connecting said member with said jaws operable to move said jaws simultaneously upon rotative movement of said member relatively to said chuck, a lug fixed on said member and projecting longitudinally from said chuck, and a dog adapted to be fixed on a work piece carrier by said work supporting means and engageable with said lug in the rotative movement of the chuck to clamp said jaws on the work piece.

14. A work driving chuck comprising a chuck body adapted to be rotated about a given axis, a plurality of work clamping and driving jaws mounted in circumferentially spaced relation on said body for straight line movement radially toward and away from said axis, a plurality of pinions mounted in said body for rotation on axes parallel to the chuck axis, one of said pinions being adjacent to each of said jaws, a rack on each of said jaws engaging the adjacent pinion, said pinions extending parallel to said chuck axis beyond said jaws, a gear mounted in said body and engaging the projecting ends of said pinions, said ring gear being freely rotatable relatively to said body, and means operable only during rotation of the chuck for retarding the movement of the ring gear relatively to the body so as to move the chuck jaws toward said axis.

15. A work driving chuck comprising a rotatable chuck body, a plurality of work clamping and driving jaws mounted on said body for rotation therewith and in circumferentially spaced relation for movement toward and away from a work piece positioned for rotation about the chuck axis, each of said jaws having a rack formed thereon, a plurality of pinions mounted in said body, one engaging each one of said racks, a gear mounted on said body and operatively connected to each of said pinions to rotate the same, and means operable to rotate said gear to move said jaws toward said axis and maintain a clamping action of the jaws on a work piece during rotation of the chuck, said means being ineffective to maintain said clamping action when the chuck is stopped.

WALTER M. SNYDER.